United States Patent
Ghannouchi et al.

(10) Patent No.: US 11,050,491 B2
(45) Date of Patent: Jun. 29, 2021

(54) RADIO ACCESS NETWORK USING RADIO OVER FIBRE

(71) Applicant: Fadhel M Ghannouchi, Calgary (CA)

(72) Inventors: Fadhel M Ghannouchi, Calgary (CA); Mahmood R Noweir, Calgary (CA); Mohamed Helaoui, Calgary (CA)

(*) Notice: Subject to any disclaimer, the term of this patent is extended or adjusted under 35 U.S.C. 154(b) by 0 days.

(21) Appl. No.: 16/932,975

(22) Filed: Jul. 20, 2020

(65) Prior Publication Data

US 2021/0105071 A1    Apr. 8, 2021

Related U.S. Application Data

(60) Provisional application No. 62/912,615, filed on Oct. 8, 2019.

(51) Int. Cl.
| | |
|---|---|
| *H04B 10/2575* | (2013.01) |
| *H04B 10/112* | (2013.01) |
| *H04B 10/61* | (2013.01) |
| *H04B 10/50* | (2013.01) |
| *H04B 10/532* | (2013.01) |

(52) U.S. Cl.
CPC ... *H04B 10/25758* (2013.01); *H04B 10/1127* (2013.01); *H04B 10/503* (2013.01); *H04B 10/532* (2013.01); *H04B 10/6151* (2013.01)

(58) Field of Classification Search
None
See application file for complete search history.

(56) References Cited

U.S. PATENT DOCUMENTS

| | | | | |
|---|---|---|---|---|
| 4,885,589 A | * | 12/1989 | Edward | G01S 7/003 342/175 |
| 8,989,257 B1 | * | 3/2015 | Akhter | H03M 7/6041 375/240 |
| 9,215,296 B1 | * | 12/2015 | Akhter | H04W 88/085 |
| 2006/0088125 A1 | * | 4/2006 | Miyatani | H04L 5/06 375/296 |
| 2011/0223958 A1 | * | 9/2011 | Chen | H04B 7/022 455/522 |
| 2012/0236774 A1 | * | 9/2012 | Guey | H04W 28/16 370/312 |
| 2013/0303216 A1 | * | 11/2013 | Teng | H01Q 1/246 455/501 |
| 2013/0337750 A1 | * | 12/2013 | Ko | H04W 24/00 455/67.13 |

(Continued)

*Primary Examiner* — Darren E Wolf (57) ABSTRACT

A radio communication system comprising an optical carrier generator for generating at least a pair of frequency spaced optical carrier signals, a transceiver configured to modulate a first portion of the pair of spaced optical carrier signals with downlink (DL) information to generate a modulated first optical signal, combine an unmodulated second optical signal formed of a remaining unmodulated second portion of the pair of spaced optical carrier signals with the modulated first optical signal to form a combined optical signal for transmission over an optical link, receive an optical uplink (UL) signal from said optical link, said optical UL signal comprising UL information modulated on said unmodulated second portion of the spaced optical carrier signals and down convert said received optical UL signal using a photodetector to output an electrical signal at a baseband frequency.

14 Claims, 11 Drawing Sheets

(56) References Cited

U.S. PATENT DOCUMENTS

| | | | |
|---|---|---|---|
| 2014/0355991 A1* | 12/2014 | Cameirao | H04B 10/27 |
| | | | 398/79 |
| 2015/0229397 A1* | 8/2015 | Shibata | H04B 10/25753 |
| | | | 398/115 |
| 2016/0204868 A1* | 7/2016 | Celo | H04B 10/516 |
| | | | 398/79 |
| 2016/0301475 A1* | 10/2016 | Li | H04B 10/503 |
| 2017/0034716 A1* | 2/2017 | Dortschy | H04W 24/02 |
| 2019/0245623 A1* | 8/2019 | Campos | H04B 10/504 |

\* cited by examiner

RADIO ACCESS NETWORK USING RADIO OVER FIBRE

FIELD

The present matter is directed to wireless communications and, more particularly to radio access network (RAN) architectures using optical links, such as radio-over-fiber (RoF).

BACKGROUND

The RAN defined in the Long term evolution (LTE) standard includes an evolved Node B (eNodeB) architecture as defined in the standard. C-RAN is an acronym for centralised or cloud radio access network, which is a more efficient implementation of the traditional eNodeB. In C-RAN, baseband units (BBU's) are housed on a central office (CO) or super macro site sometimes referred to as a BBU hotel. Connectivity from each BBU to its corresponding eNodeB, which may house a remote radio head (RRH), is typically provided using a common public radio interface (CPRI) interface over an optical fiber link. Communication over the optical fiber is achieved by modulating a light signal, usually provided by a laser, using a radio frequency (RF) signal which is then transmitted over the optical fiber link. This architecture is usually termed Radio over Fiber (RoF). The fiber may carry a digital representation of an RF radio signal which is then converted to the RF signal directly at the RRH. Transmission over the standard fibre introduces low loss in the telecommunications band which allows distances between central stations and wireless end users to be extended, maximizing coverage in for example microcell networks. In the BBU hotel, a router connects all the BBU's and, in turn, connects to the evolved packet core (EPC) usually over an Si interface. For a cloud-based architecture the BBU's are virtualised in software running on a common off-the-shelf computer architecture, such as an x86 based server. Depending on the power of the server hardware, multiple virtual BBUs may be supported along with a virtual router. This provides a less complex, more efficient, and lower cost platform.

RoF implementations are expected to dominate deployments of future 5G (fifth generation) wireless networks, as this allows the transmission of 5G broadband RF signals over low loss fibers.

SUMMARY

In accordance with some aspects of the present matter, radio access network comprises multiple geographically distributed base transceiver stations, a fronthaul network, and a central processor, wherein the base transceiver stations are connected to the central processor via the fronthaul network. The fronthaul network may include optical transport networks, including one or more of fiber optic links, free space optical links, and wireless links for connecting each base transceiver station to the central processor.

In accordance with an aspect of the present matter the fronthaul optical transport network provides for transmission of broadband RF signals by modulating laser carrier signals over the optical transport network. The optical transport network comprising optical fibers having high-bandwidth, low-latency, and low loss.

Furthermore, there is provided bidirectional or full-duplex communication over the optical transport network between the central processor and each base transceiver station. The present architecture also provides benefits in that uplink (UL) and downlink (DL) signals are not transmitted on two different fibers, thereby simplifying hardware and reducing reliance on complex components in setup.

The present architecture further provides benefits of frequency conversion, wherein a multi tone optical carrier may be used in frequency up-conversion and down-conversion of UL and DL signals. In one embodiment the central processor may generate the multi tone optical carrier from a single optical tone.

An aspect of the present matter includes a method implemented in a mobile communications system wherein, the base transceiver stations may operate solely as radio units (e.g., remote radio heads), while the RAN baseband processing is performed at the central processor within the operator's network. The present architecture may be adaptable to C-RAN architecture. In one aspect the architecture is adaptable to the C-RAN architecture by providing bidirectional or full-duplex communication over the optical network between the central processor and each base transceiver station. The central processor may include one or more cloud baseband units (C-BBU).

In accordance with a further aspect of the present matter, the architecture provides for reducing interference and cross talk when frequency band of uplink and the downlink signals are adjacent In accordance with another aspect of the present matter the architecture provides for use of inexpensive off-the shelf components in implementing the central processor. In one aspect the present matter provides for use of inexpensive lasers obviating complex stabilization circuits. Examples of complex stabilization circuits include polarization independent reflective modulators (PIRM) to provide compensation for instability of optical modulators with temperature change.

Furthermore, embodiments of the present matter may be used in transmitting broadband 5G signals at wideband frequency carriers in a range down to millimeter wavelengths.

Furthermore, embodiments of the present matter provide for less complex and expensive transceiver units. The present architecture provides some benefits over typical receiver where previously a feedback path was used to mitigate crosstalk of the received optical signal due to the change in the state of polarization (SOP).

The present matter provides a system and method for a C-RAN architecture having full-duplex data communication using radio-over-fiber or free space optics.

In one aspect the present matter provides a system and method in a communication network architecture for simultaneous two-way communications between a central baseband point and distant radio access units. The network can support broadband 5G signals and mixer-less frequency conversions. In one aspect, the architecture includes a central station connected in a star architecture to multiple remote units through fiber optics cables. The central station generates two-tone optical carrier signal by means of modulating a single optical laser tone. In addition to being used as a carrier signal, the two-tone signal may be used as frequency up and down conversion for the information signals. Two linear orthogonal polarization states are used to carry the data in the downlink (DL) and uplink (UL) directions. This advantageously provides for one standard single mode (SM) fiber optic cable to establish full-duplex communication between central station and each remote unit. This architecture has no restrictions on the frequencies assigned for both DL and UL signals.

Furthermore, the present architecture provides benefits of unrestricted assignment of the frequencies for both DL and UL signals. And further provides for real time compensation using a calibrated observation path (COP). In an embodiment of the present matter the COP utilises a copy of the output RF signal from the remote units at the central station.

In some aspects of the present matter there is provided a non-transitory computer-readable medium with instructions stored thereon.

BRIEF DESCRIPTION OF THE DRAWINGS

The present matter will become more fully understood from the detailed description and the accompanying drawings, wherein.

DETAILED DESCRIPTION

In the present description similar components in the figures are represented by like numerals. Furthermore in the description, it is conventionally understood that DL and UL are defined in terms of the separate air interfaces used in the context of LTE, namely DL refers to communication from tower to device, and UL refers to communication from device to tower. However this terminology is used for convenience of only, embodiments of the RoF architecture described herein may be integrated into a large variety of applications, including military radar, radio astronomy and spectroscopy, secure sensing, photonic signal generation, data up-conversion techniques, and massive multiple-input-multiple output (MIMO) systems.

Figure 1:
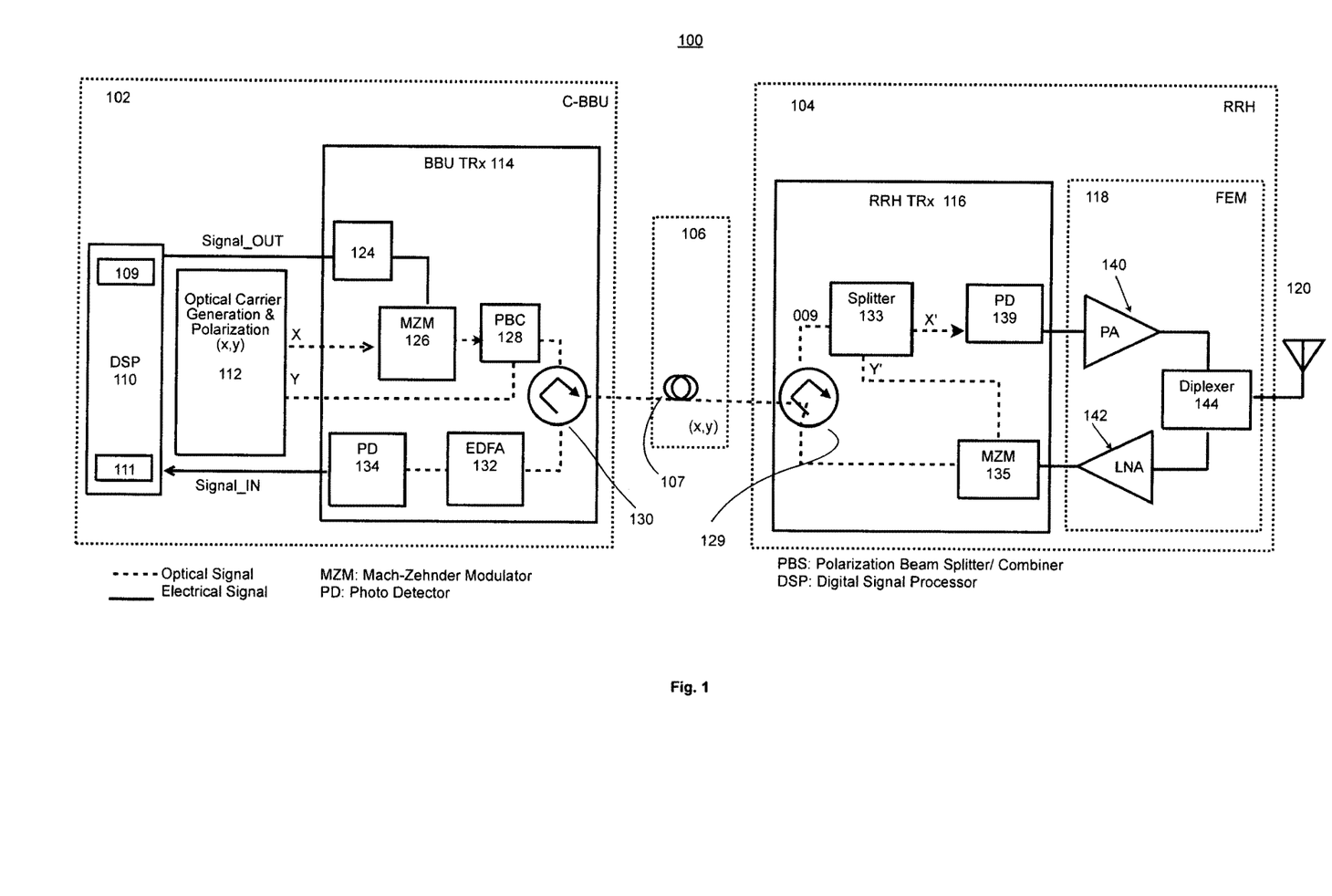
FIG. 1 shows a general block diagram of a single link architecture for a RAN system using an RoF transceiver according to an embodiment of the present matter.

Referring to FIG. 1 there is shown a general block diagram of a single link RAN system 100 according to an embodiment of the present matter. The RAN or C-RAN system 100 includes a central processor termed a centralized base band Unit (C-BBU) 102, a base transceiver unit 104 termed a remote radio head (RRH) and a fronthaul link 106 connecting the C-BBU to the RRH. The fronthaul link 106 includes, in an embodiment, at least a fiber optic link 107. In further embodiments free air optic links may also be employed.

In the illustrated embodiment, the C-BBU 102 includes a DSP block 110, and an optical carrier generation and polarization block 112 configured to generate at least a pair of frequency spaced optical carriers, and further configured to generate orthogonally polarised optical signals X, Y based on the generated spaced optical carriers. The C-BBU 102 further includes a BBU transceiver 114 coupled between the DSP 110 and the link 106, and is driven by optical signals from the optical carrier generation and polarization block 112 and electrical signals from the DSP 110. The RRH 104 includes an RRH transceiver 116 and an RF front-end module (FEM) 118 which connects to one or more transmit and receive antennas 120. The RRH transceiver 116 is in turn coupled between the fronthaul link 106 and the FEM 118. The DSP 110 includes a signal generator 109 for providing the baseband, IF or RF modulated electrical signals (Signal_OUT) for the DL signal, and an UL signal processor 111 for processing the received electrical signals (Signal_IN), from the BBU transceiver 114.

The BBU transceiver block 114 includes in a DL signal path an optional intermediate frequency (IF) mixer 124, and a Mach-Zehnder modulator (MZM) 126 a polarization beam (PBC) combiner 128. The mixer 124 receives the signals (signal_OUT) for the DL from the DSP 110, and drives the MZM 126 to modulate one of the polarised optical signals X input from the optical carrier generation and polarization block 112, which is outputs a modulated optical signal $X_{mod}$ to the PBC 128. The PBC 128 combines the modulated optical signal $X_{mod}$ with the other (unmodulated) optical signal Y from the polarization block 112 to form a DL signal. The DL signal is coupled to a first port of an optical circulator 130 which has a second port coupled to the link 106 conveying the signal to the RRH.

The BBU transceiver block 114 further includes in an UL signal path, an erbium doped fiber amplifier (EDFA) 132 and, a photodetector 134. A received UL signal on the link 106 is coupled from a third port of the circulator 130 to the input of the EDFA 132 to drive the photodetector 134 which outputs an electrical signal (Signal_IN) for the UL signal to the DSP 110.

The RRH transceiver 116 includes in a DL signal path, an optical circulator 129, an optical splitter 133, and a PD 139. The optical circulator 129 has a first port connected to the link 106, a second port connected to the optical splitter 133 for recovering second orthogonally polarised signals X', Y' from the previously combined X, Y signals in the DL signal, wherein the one of the orthogonal signals X' is input to the PD 139.

The RRH transceiver 116 further includes in an UL signal path an MZM 135. The other of the orthogonal signals Y' recovered by the splitter 133 is output to an optical input of the MZM 135. An optical output of the MZM 135 is coupled to a third input port of the circulator 129.

In the DL signal path, the PD 139 outputs an electrical signal to the FEM 118. In the UL signal path, the MZM 135 receives, and is driven by an electrical signal output from the FEM 118.

The FEM 118 includes a power amplifier (PA) 140 for amplifying input DL information signals before transmission, a low noise amplifier (LNA) 142 for amplifying received UL information signals, and a diplexer 144 connected to the LNA 142 and PA 140 and the antenna 120 for transmitting and receiving, respectively, the DL and UL information signals to and from the antenna 120.

As may be seen from the illustrated architecture 100, the UL signal path does not include local oscillators to extract the baseband signal, but instead by having frequency spaced optical carriers, a baseband signal may be automatically provided at the output of the PD 134 to the DSP 110. This may be better understood by referring to the description below.

Figure 2:
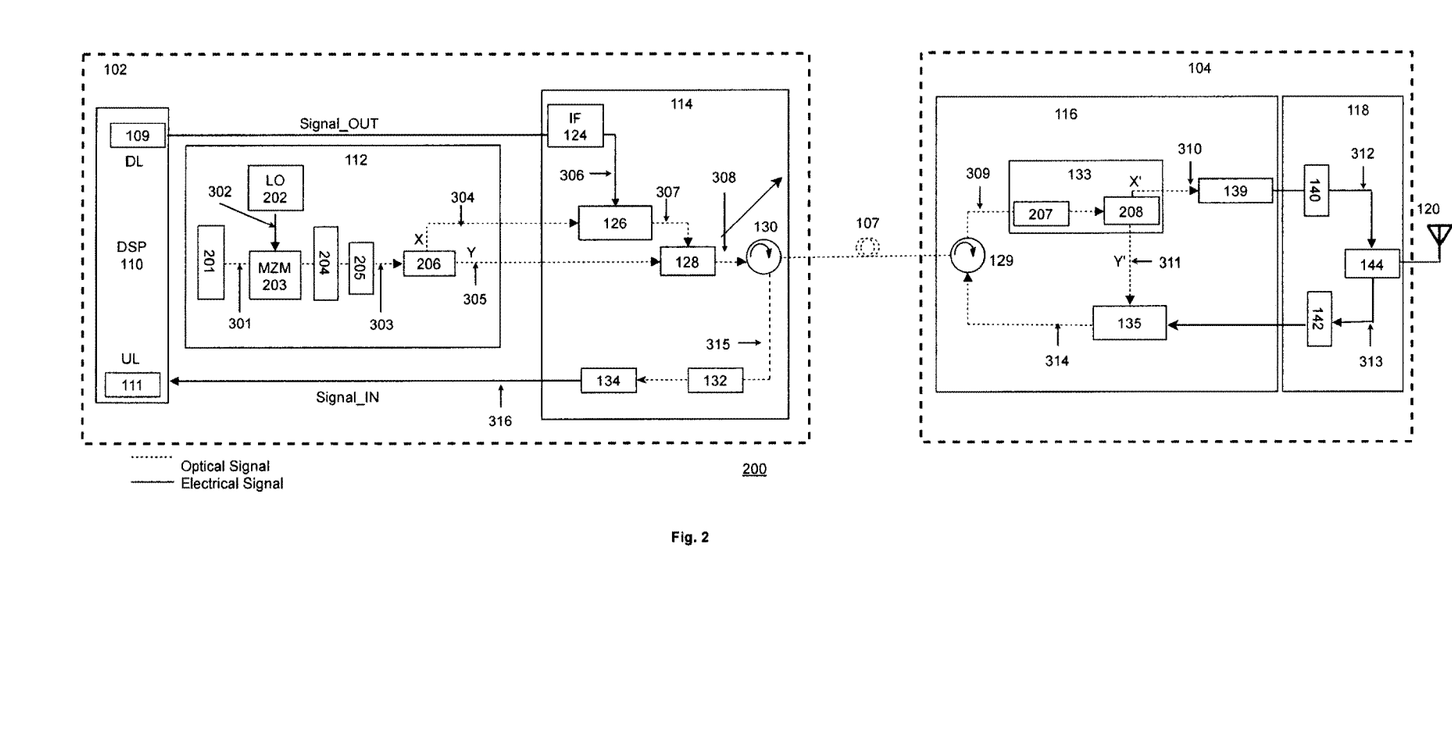
FIG. 2 shows a detailed block diagram of the single link architecture according to an embodiment of the present matter.

Referring to FIG. 2, there is shown a detailed description of the optical components 200 for the C-RAN system 100 according to an embodiment of the present matter. For brevity, similar components described in the figures will be referenced with the same numerals. In the illustrated embodiment, the optical carrier generation and polarization block 112 is comprised of an off-the-shelf distributed feedback laser (DFBL) source 201, a single-drive (one input/output optical port) Mach-Zehnder optical interferometer (MZM) 203, a local oscillator (LO) 202 which may have a tunable frequency, an Erbium doped fiber amplifier (EDFA) 204, polarization controller 205 and a polarization beam splitter (PBS) 206. The DFBL 201 emits light at an optical frequency fop. It may be used as a sole optical carrier source to operate the entire network, as will be explained later. The LO 202 may be implemented as any known electrical signal generator to output a sinusoidal wave with a tunable frequency $f_{LO}$. A first electro-optic modulation process occurs at the MZM optical interferometer 203. It is to be noted that the optical modulator as used herein may be a single-drive modulator with one RF port, and one DC port. The laser signal output from DFBL 201 is electrically modulated at the MZM optical interferometer 203 by the sinusoidal signal that is generated from the LO 202. The modulator 203 together with the LO 202, are configured to generate the spaced optical carriers. For example, with a fixed LO frequency $f_{LO}$ the generated optical carriers are spaced at $2f_{LO}$. The optical signal may then be amplified by the EDFA 204 and have a random SOP adjusted by the polarization controller 205 before it is orthogonally split by the polarization beam splitter (PBS) 206 to output two linear orthogonal SOP signals from the PBS, which are referenced in FIG. 1 as the X and Y signals and which is input to the C-BBU transceiver block 114.

Turning now to the optical splitter 133 included in the RRH transceiver 116. The optical splitter 133 includes a polarization controller 207 and a PBS 208. The polarization controller receives the DL optical signal from the circulator 129 and adjusts the random SOP in the received DL signal for polarization splitting at the PBS 208, which in turn recovers the orthogonally polarised optical beams X' and Y'. The PD 139 receives one of the polarised optical DL information signals (X' or Y') from the C-BBU transceiver block 114, in the illustrated embodiment shown as signal X', and converts it into an electrical signal. The electrical DL signal is input to the PA 140 which boosts the DL signal, at the desired frequency and outputs this amplified DL signal to the diplexer 144 for broadcasting to the air by the antenna 120.

Furthermore for an UL signal received at the antenna 120, the antenna passes the signal to the diplexer 144, which in turn passes the signal to the LNA 142, where the UL signal is filtered at a chosen frequency and amplified by the LNA 142. The LNA 142 outputs the signal to optical modulator 135 wherein the other of the orthogonally polarised signals (Y') is modulated by the input UL signal from the LNA 142. The optical modulator 135 outputs an optical carrier modulated by the UL information signal. This signal is directed by the circulator 129 through the fiber link 107, to the circulator 130 and finally to the BBU transceiver block 114, wherein the EDFA 132 optically boosts the modulated UL signal before outputting the signal to the PD 134.

Figure 3:
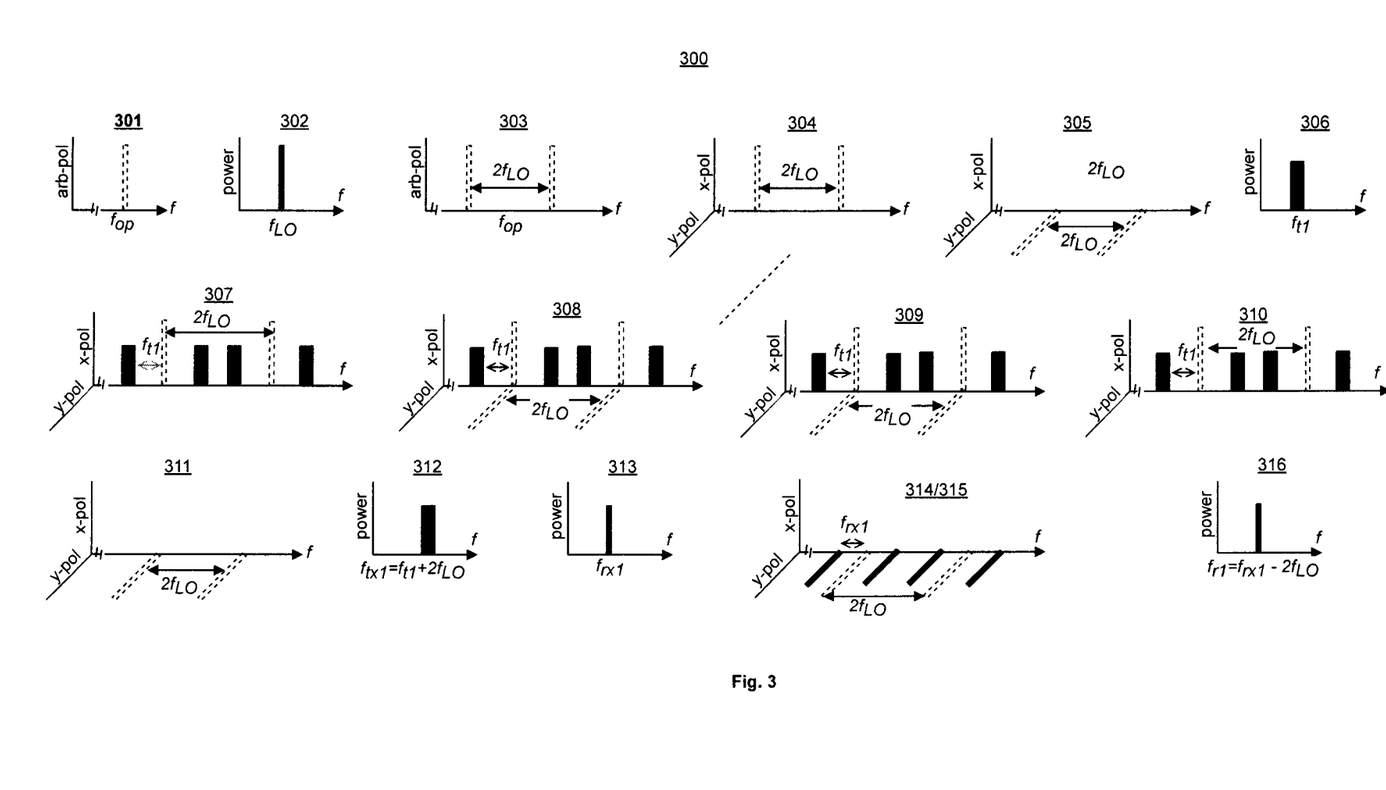
FIG. 3 shows spectra of optical and electrical signal propagation at different locations in the single link architecture according to an embodiment of the present matter.

Referring to FIG. 3 there is shown signal frequency spectra 300 of both the optical and electrical signals in the UL signal and the DL signal directions in the C-RAN system 100 according to an embodiment of the present matter. Each of the spectra is referenced to a location in the C-RAN system 100 as shown in FIG. 2. Accordingly, reference is made to both FIG. 2 and FIG. 3. The dashed lines in the figures refer to the spectra of the optical signals and the solid lines refer to spectra of the electrical signal. The DFB laser 201 generates an optical spectrum 301 at an optical frequency $f_{op}$. Diagram 302 shows an electrical sinusoidal signal spectrum generated from the LO 202 at the frequency $f_{LO}$. Diagram 303 shows the spectrum of a pair of frequency spaced optical carriers generated by the modulator 203. These signals 303 may be linearly polarized in an arbitrary direction. The spacing or frequency difference between the optical carrier is $2f_{LO}$ which in the illustrated embodiment provides a two-tone optical carrier used in the DL and UL signals. Diagram 304 shows a spectrum of the X polarised signal at one of the outputs of the PBS 206, and diagram 305 shows a spectrum of the Y polarised signal at the other output the PBS 206 stage. As may be seen the spectra 304 and 305 are mutually orthogonal and spaced respectively at $2f_{LO}$. Diagram 306 shows a spectrum in the electrical domain of the DL information signal at a frequency $f_{t1}$. Diagram 307 shows a spectrum of the modulated X two-tone optical carrier signal output from the modulator 126, wherein the solid lines represent the double side bands of the information signal spaced by $f_{t1}$ around each carrier, represented by the dashed lines. Diagram 308 shows a spectrum output from the PBS 128 where unmodulated Y polarised signal is combined orthogonally with the modulated X polarised signal. Diagram 309 shows a spectrum after passing through the first circulator 130, the fiber cable 107, and the second circulator 132, for input to the polarization controller 207. The random polarization is adjusted at 207 so that the X' and Y' mutually orthogonal polarised signals are produced. Diagram 310 shows a spectrum of the modulated X' polarised signal after PBS in 208. Diagram 311 shows a spectrum of the modulated Y' polarised signal after PBS in 208. Diagram 312 shows an electrical domain spectrum of the extracted DL information signal at a chosen transmit frequency $f_{tx1}=2f_{LO}+f_{t1}$. This signal is produced at the output of the PA 140 after passing through the PD 139 and the PA 140 stages. Diagram 313 shows an electrical spectrum of the UL signal received by the antenna 120, which is filtered and amplified at a receive frequency $f_{rx1}$, by the LNA 142. Diagrams 314 and 315 show an optical domain of the spectrum of the Y' signal after being modulated by the received UL information signal at the modulator 135 before being optically amplified by the EDFA 132. Diagram 316 shows an electrical domain spectrum of the UL information signal at the chosen frequency fr1 after being received at the C-BBU 102 and extracted at the PD 134 output. The transmitter frequency ftx and the receiver frequency frx are obtained from the beating of the optical tones with the information bands in the PD and they can be given as the formulas on the figure. In other words, for example by having the two-tone optical carrier there is a choice to receive the DL signal either at $f_{DL}=f_t$ or, $f_{DL}=f_t-2f_{LO}$, or at $f_{DL}=f_t+2f_{LO}$. Furthermore, the two-tone optical carrier can automatically convert the UL frequency to different bands $f_{UL}=f_r$, or $f_{UL}=f_r-2f_{LO}$, or $f_{UL}=f_r+2f_{LO}$.

Figure 4:
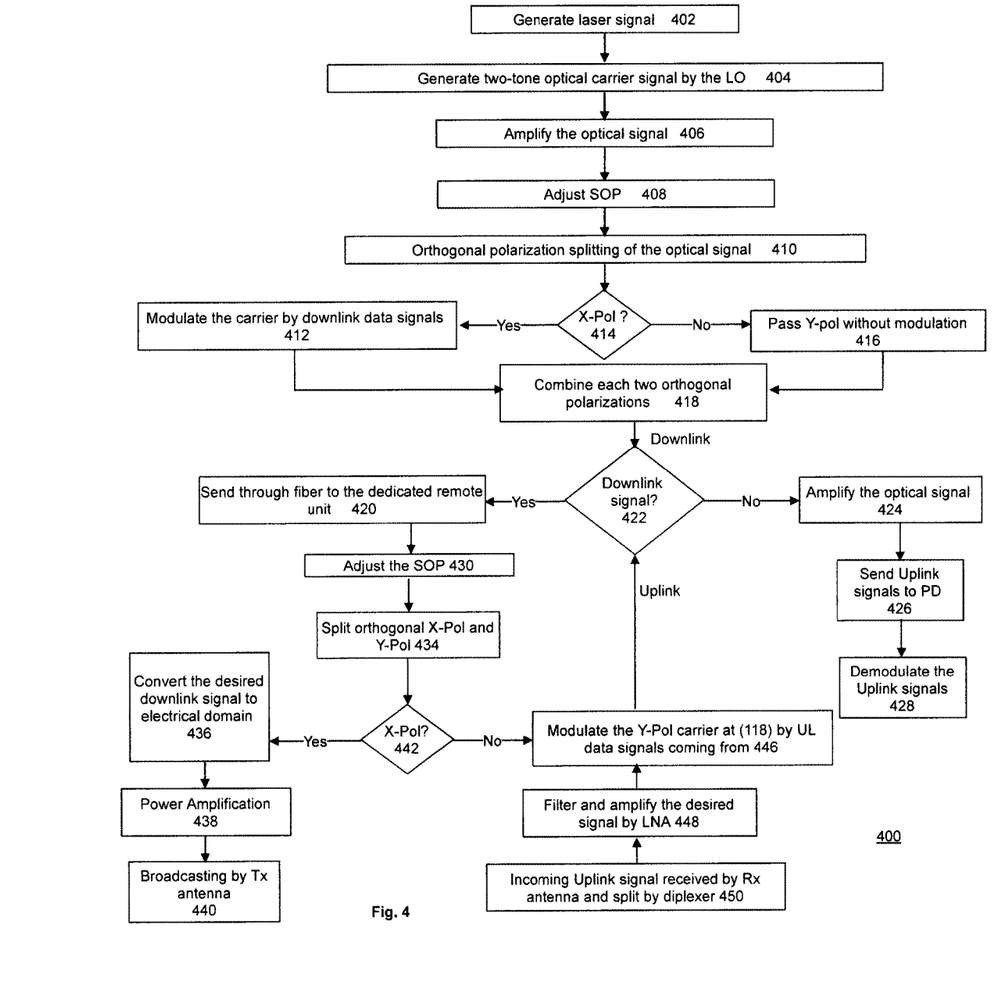
FIG. 4 shows a flow chart of operation for the single link architecture according to an embodiment of the present matter.

Referring to FIG. 4 there is shown a flow chart 400 for a method of operation of the C-RAN network 100 according to an embodiment of the present matter. At step 402 an optical carrier with a spectrum 301, may be generated by, for example, an inexpensive off-the-shelf DFBL. Such DFBL's may typically emit light at a wavelength of 1548.51 nm ($F_{op}$), with a power in a range of 30 mW or so, and a maximum spectral width of 5 MHz. A temperature stability circuit for this laser may not be necessary as it may be seen from the architecture of the transceivers and the spectra, that a beat frequency of the carriers and information signals is independent of the temperature drift.

At step 404 the two-tone optical carrier is generated, the laser signal from step 402 is modulated by for example the LO 202 signal that is fed to the RF port of the modulator 203. The frequency of the LO is based on a chosen frequency up/down conversion. The resulting two-tone optical carrier is obtained by adjusting a dc bias of the modulator 203, for example, to minimum transmission point (MTP). At this point the main laser tone at $f_{op}$ is suppressed while the double side bands are left at their maxima, as shown in 303 or 304 in FIG. 3. The optical signal may be amplified at 406 stage by for example using the amplifier 204 in order to overcome signal losses in the transceiver signal path. This amplification produces a random SOP that is adjusted at step 408 immediately by the polarization controller 205.

At step 410 orthogonal polarization, as one example, is used to split the adjusted optical signals in order to achieve full-duplex link operation, using for example the PBS 206 to produce the two-tone signals, i.e. a x-polarised signal X for the DL and a y-polarised signal Y for the UL signal processing.

At step 414 data communication between the central station 102 and remote unit 104 is started. The x-polarised DL optical carrier X is modulated, step 412 by for example at the optical modulator 126 by the information DL signals from the signal generator 109 and the optional IF mixer 124 while the y-polarised signal Y is sent without modulation, step 416, across the optical link 107. At step 418, the modulated x-polarised signal and the unmodulated y-polarised signals are combined by for example the PBS 128 to form as the combined signal, the DL signals.

At step 422 signals are either sent across the link 107 as the DL signal or received from the link 107 as the UL signal.

In the case of an UL signal received at step 422 at the RRH 102, the UL signal is amplified at step 424 and converted at step 426 to an electrical signal and demodulated at step 428.

However, in the case of a DL signal at step 422 the DL signal is sent, step 420 across the link 107 to the RRH 104. At step 430 the SOP is adjusted in the RRH 104 and split into the orthogonal, x-polarised and y-polarised signals X', Y' at step 434.

At step 442, the polarised X' signal and Y' signal, generated at step 434, are processed differently. At step 436 the X' signal is converted to the electrical domain, amplified at step 438 and broadcast at step 440.

The Y' signal is used in the optical domain at step 446 to modulate the received UL signal, converted at step 446 from the electrical domain to the optical domain. For the UL path, the received UL information signal is captured by the Rx antenna at step 450 and filtered and amplified by the LNA 142 at step 448, which may then be converted to the optical domain in the step 446. The modulated UL signal is then passed to the C-BBU 102 where it is processed in step 422 as described above.

It may be seen that the y-polarised optical carrier is modulated by the UL information signal at modulator 135. Both circulators, 129 at the RRH and 130 at the C-C-BBU, work together with the optical link 107 to deliver the UL information signal back to the C-BBU transceiver 114. The incoming UL signal is amplified optically by the EDFA 132. The optical spectrum of the modulated UL signal is shown in the spectrum diagram 314 of FIG. 3. The PD 134 extracts the desired UL signal as shown in the spectrum diagram 315 of FIG. 3. The second circulator 129 forwards the DL signal to the polarization controller 207. The controller 207 adjusts the random polarization to linear polarization and aligned equally to the PBS 208 so that the x-polarized signal goes to the PD 139 and the y-polarised signal goes to the UL modulator 135. The DL information signal is converted to the electrical domain, filtered and amplified by the PA 140 and broadcasted to air by the DL antenna, as shown in the spectrum plot 312 of FIG. 3.

Figure 5:
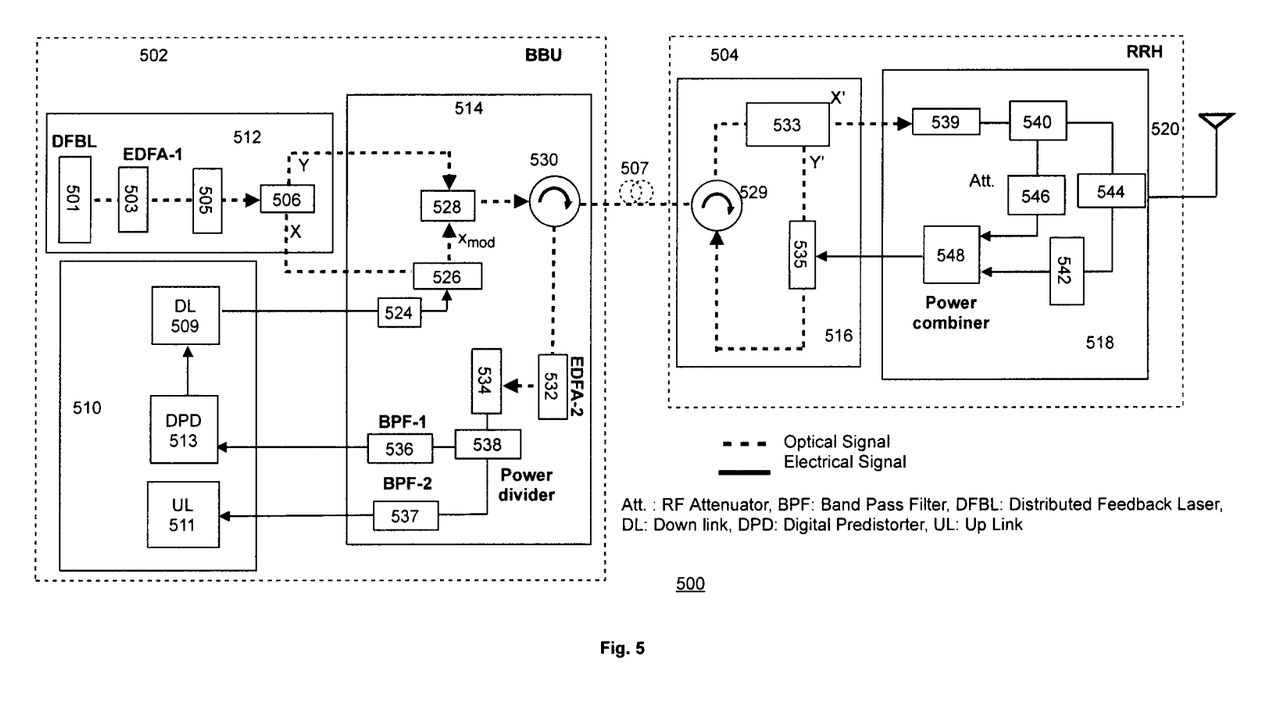
FIG. 5 shows a block diagram of a linearized RoF transceiver according to a further embodiment of the present matter.

Referring to FIG. 5 there is shown a block diagram of a linearized C-RAN system 500 according to a further embodiment of the present matter. Similar to the C-RAN system 100, the system 500 includes a C-BBU 502, a RRH 504, and a fronthaul optic link 507 connecting the C-BBU 502 to the RRH 504.

The BBU 502 includes an optical generation block 512, a DSP block 510 and a BBU transceiver 514.

The optical generation block 512 includes a DFBL source 501, a first EDFA 503, a polarization controller 505, and a PBS 506.

The DSP block 510 includes a DL signal generator 509, an UL signal processor 511, and a DPD block 513.

The BBU transceiver 514 includes a transmit path having an optional IF mixer 524, an MZM 526, a PBS combiner 528, an optical circulator 530, and a receive path having a second EDFA 532, photodetector 534, a power divider 538, and first band pass filter (BPF) 536 and a second BPF 537.

Operation of the BBU transceiver 514 is similar to that as previously described embodiments. However, this embodiment includes a DPD function block for linearization of the signals to compensate for any nonlinearity and hardware impairment generated in the optical and or electrical paths. As previously described, the optical generation block 512 generates the mutually orthogonal polarised optical signals X and Y. The IF mixer 524 receives an electrical signal (signal_OUT) from the DL signal generator 509 in the DSP 510, and drives the MZM 526 with an output signal to modulate one of the optical signals X input from the optical carrier generation and polarization block 512. The MZM 526 outputs a modulated optical signal to the PBS combiner 528. The PBS 528 combines the modulated optical signal $X_{mod}$ with the other (unmodulated) optical signal Y from the polarization block 512. The combined signals are output to a first port of the optical circulator 530 which has a second port coupled to the fiber optic cable 507. A third port of the circulator 530 is coupled in the receive path, to an input of the second EDFA 532 which couples an UL signal from the link 507 to drive the photodetector 534 which in turn outputs an electrical signal to the power divider 538. The power divider feeds the respective split signals in parallel to the respective first and second band pass filters BPF 536 and 537. The first BPF 536 has an output coupled to feed a signal to the DPD block 513, and the second BPF 537 has an output coupled to feed a signal to the UL block 511.

Turning now to the RRH 504, the RRH includes an RRH transceiver 516, and a FEM 518. The RRH transceiver 516 includes a second optical circulator 529, an optical splitter 533, and an MZM 535, and a PD 539. The optical circulator 529 has a first port connected to the fiber optic cable 507, a second port connected to the optical splitter 533 for generating second orthogonally polarised signals X', Y', wherein the one of the orthogonal signals X' is input to the PD 539 and the other orthogonal signal Y' is output to an optical input of the MZM 535. An optical output of the MZM 535 is coupled to a third input port of the circulator 529. The PD 539 outputs an electrical signal to the FEM 518 and the MZM 535 receives an electrical signal output from the FEM 518.

The FEM 518 includes the PD 539, a PA 540, a diplexer 544, an attenuator 546, an LNA 542, and a power combiner 548. The FEM 518, in this embodiment, includes a feed back path providing a signal for use in linearization. The DL signal is fed to the PA 540 where it is amplified and output to the diplexer 544, and signal is also fed back through the attenuator 546 to one input of the power combiner 548. The power combiner 548 has a second input for receiving an UL signal output from the LNA 542. The power combiner 548 combines both the attenuated DL feed back signal from 546 and the received UL signal and outputs a combined signal to the single MZM 535 which uses the signal to modulate the Y' signal for output to the circulator 529 for transmission back to the BBU 502 across link 507.

The system 500 illustrates a linearized RoF transmitter using a DPD in the architecture of the RoF transceivers (BBU transceiver and RRH transceiver) augmented with a feedback path for digital predistortion (DPD) using a single MZM at the RRH to convert a combined RF feedback/DL signal and a RF received/UL signal from electrical signals to optical signals. In other words, the embodiment provides for modification of the RoF Transceiver architecture to include a feedback/observation path to sample the DL signal at the output of power amplifier before transmission over the air by the antenna. This down-converted feedback signal at the BBU along with the input baseband signal is used to construct a digital base band predistortion model to predistort the DL signal, by the post-processing block in BBU. This may compensate for any nonlinearity and hardware impairment generated in RoF transmitter by both the electrical and optical components.

Figure 6:
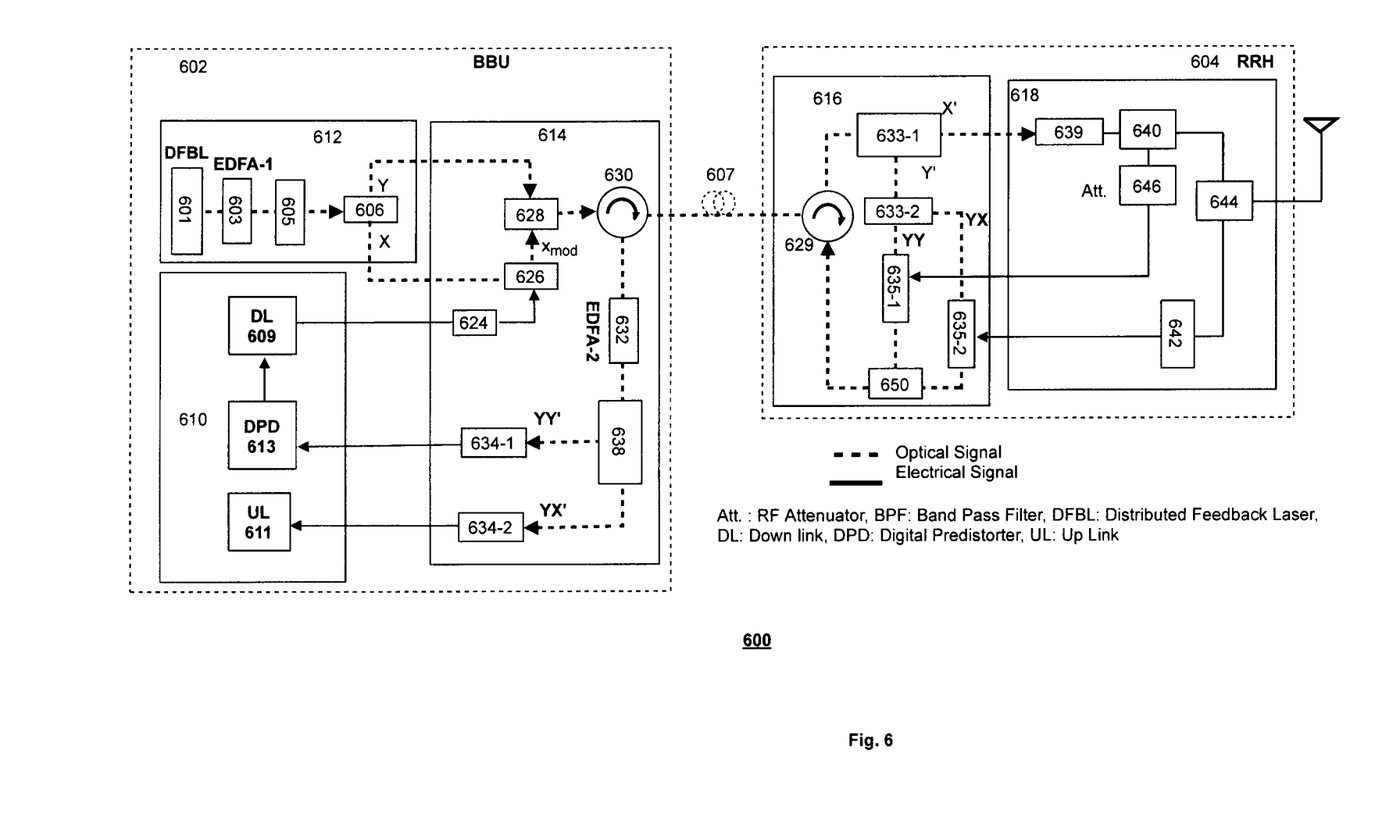
FIG. 6 shows a block diagram of a linearized RoF transceiver according to a still further embodiment of the present matter.

Referring now to FIG. 6 there is shown a block diagram of a linearized C-RAN system 600 according to a still further embodiment of the present matter. Similar to the linearized C-RAN system 500, the system 600 includes a C-BBU 602, a RRH 604, and a fronthaul optic link 607 connecting the C-BBU 602 to the RRH 604. The linearized RoF transmitter in this embodiment 600 is augmented with a feedback path for digital predistortion (DPD) linearization using feedback signals in the optical domain. In other words the transceivers are configured to use two MZMs at the RRH 604 to respectively and separately use a RF feedback/DL signal and a RF received/UL signal to modulate optical signals, which are then combined to be transmitted across the fiber to the BBU.

The BBU 602 includes an optical generation block 612, a DSP block 610 and a BBU transceiver 614.

The optical generation block 612 includes a DFBL source 601, a first EDFA 603, a polarization controller 605, and a PBS 606.

The DSP block 610 includes a DL signal generator 609, an UL signal processor 611, and a DPD block 613.

The BBU transceiver 614 includes a transmit path having an optional IF mixer 624, an MZM 626, a PBS combiner 628, an optical circulator 630, and a receive path having a second EDFA 632, an optical polarization splitter 638, a first photodetector 634-1, a second photodetector 634-2.

Operation of the BBU transceiver 614 is similar to that as previously described embodiments. However, this embodiment includes a DPD function block 613 for linearization of the signals to compensate for any nonlinearity and hardware impairment generated in the optical and or electrical paths. As previously described, the optical generation block 612 generates the mutually orthogonal polarised optical signals X and Y. The IF mixer 624 receives an electrical signal (signal_OUT) from the DL signal generator 609 in the DSP 610, and drives the MZM 626 with an output signal to modulate one of the optical signals X input from the optical carrier generation and polarization block 612. The MZM 626 outputs a modulated optical signal to the PBS combiner 628. The PBS 628 combines the modulated optical signal $X_{mod}$ with the other (unmodulated) optical signal Y from the polarization block 612. The combined signals are output to a first port of the optical circulator 630 which has a second port coupled to the fiber optic cable 607. A third port of the circulator 630 is coupled in the receive path, to an input of the second EDFA 632 which couples an UL signal from the link 607 to the optical polarization splitter 638. The splitter outputs two signal YY' and YX' coupled to the respective photodetectors 634-1 and 634-2. The first photodetector (converter) 634-1 has an output coupled to feed a signal to the DPD block 613, and the second photodetector (converter) 634-2 has an output coupled to feed a signal to the UL block 611.

The RRH 604 includes an RRH transceiver 616, and a FEM 618. The RRH transceiver 616 includes a second optical circulator 629, first and second optical splitters 633-1, 633-2, first and second MZM's 635-1, 635-2, and an optical polarization combiner 650.

The optical circulator 629 has a first port connected to the fiber optic cable 607, a second port connected to the first optical splitter 633-1 for generating a second pair of orthogonally polarised signals X', Y', wherein the one of the orthogonal signals X' is input to the FEM 618 and the other orthogonal optical signal Y' is output to the second optical polarization splitter 633-2 for generating a third pair of orthogonally polarised signals YY, YX, where YY is the y-polarised and YX is the x-polarised signals recovered from the Y' signal. The optical signal YY is coupled to an optical input of the first MZM 635-1 and the optical signal YX is coupled to an input of the second MZM 635-2. The outputs from the MZM's are coupled to the polarization combiner 650 where they are combined and forwarded to the link 607 to the BBU 602. Each of the first and second MZM's 635-1, 635-2 are controlled by respective signal output from the FEM 618 as will be explained below.

The FEM 618 includes the PD 639, a PA 640, a diplexer 644, an attenuator 646, and an LNA 642. The FEM 618, in this embodiment, includes a feed back path providing a signal for use in linearization. The DL signal from the optical polarization splitter 633-1 is converted by the PD 639 and fed to the PA 640 where it is amplified and output to the diplexer 644, the amplifier output is also coupled via the attenuator 646 to drive the first MZM 635-1 which modulates the YY signal. An UL signal output from the LNA 642 is coupled to drive the second MZM 635-2 which modulates the YX signal. The signals output from the MZM's are combined in the polarization combiner 650 for output to the circulator 629 for transmission back to the BBU 602 across link 607.

It may be seen that linearization of the system may be achieved by inclusion of a feedback/observation path to sample the DL signal at the output of power amplifier before transmission in the air by the antenna. The down-converted feedback signal may then be used at the BBU along with the input baseband signal to construct a digital baseband predistortion model to predistort the DL signal. This may be implemented by the post-processing block in the BBU, to compensate for any nonlinearity and hardware impairment generated by both the electrical and optical components in the system.

Figure 7:
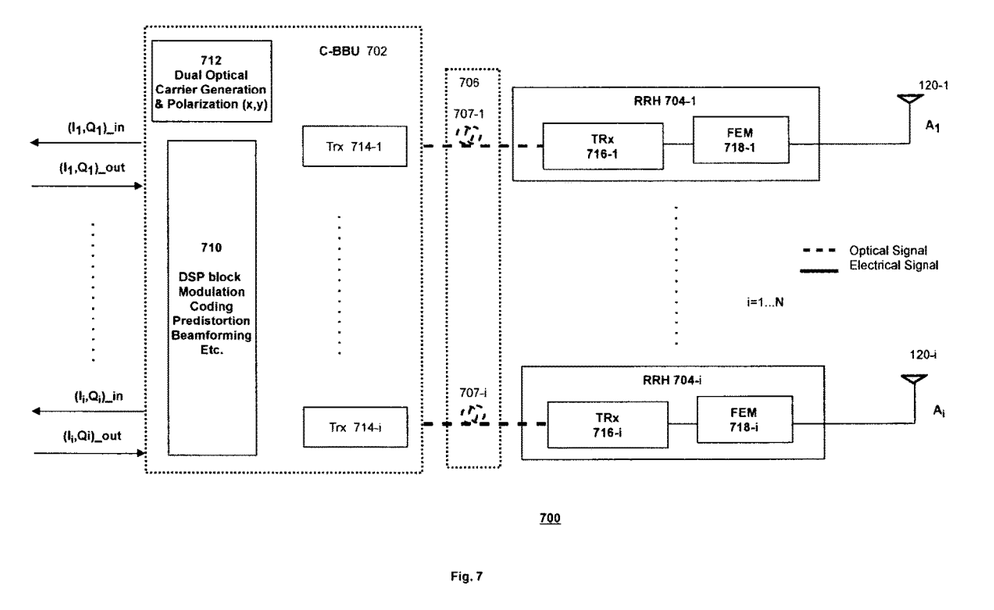
FIG. 7 shows a block diagram of a multiple link architecture for the C-RAN system using the RoF transceivers according to an embodiment of the present matter.

Referring to FIG. 7 there is shown an N-link (N being an integer) C-RAN network architecture 700 according to an embodiment of the present matter. The C-RAN 700 includes C-BBU 702, a plurality of base transceiver units 704-$i$ or RRH's and a fronthaul link 706 connecting the C-BBU 702 to the plurality of RRH's 704-$i$. The front haul link 706 may include one or more fiber optic links 707-$i$ or in further embodiments free-air optic links may also be employed or a combination of free-air optics, and fibre optic links.

In this N-link C-RAN architecture 700, the C-BBU 702 includes a dual optical carrier generation and polarization block 712 for generating the x-polarised and y-polarised optical signals, a DSP block 710 providing one or more functions of modulation/demodulation, signal encoding, predistortion, and beamforming. The C-BBU 702 further includes N C-BBU transceivers 714-$i$ (i–1 ... N) each of which is connected via respective ones of N standard single mode (SM) fiber optic cables 707-$i$ to one of the respective N RRH's 704-$i$. The transceivers 714-$i$ provide an interface between baseband and modulated information signals.

Furthermore, each RRH's 704-$i$ includes a RRH transceiver 716-$i$ and a FEM 718-$i$ coupled to a respective antenna Ai 120-$i$.

As will be appreciated the components in the N-link C-RAN network architecture 700 are configured to perform the same functions as those described with respect to the single link implementation of FIG. 1 above. Therefore, for brevity will not be further described. Furthermore, the linearization and DPD as described in embodiments above may also be implemented in one or more of the N links in the present embodiment 700.

Figure 8:
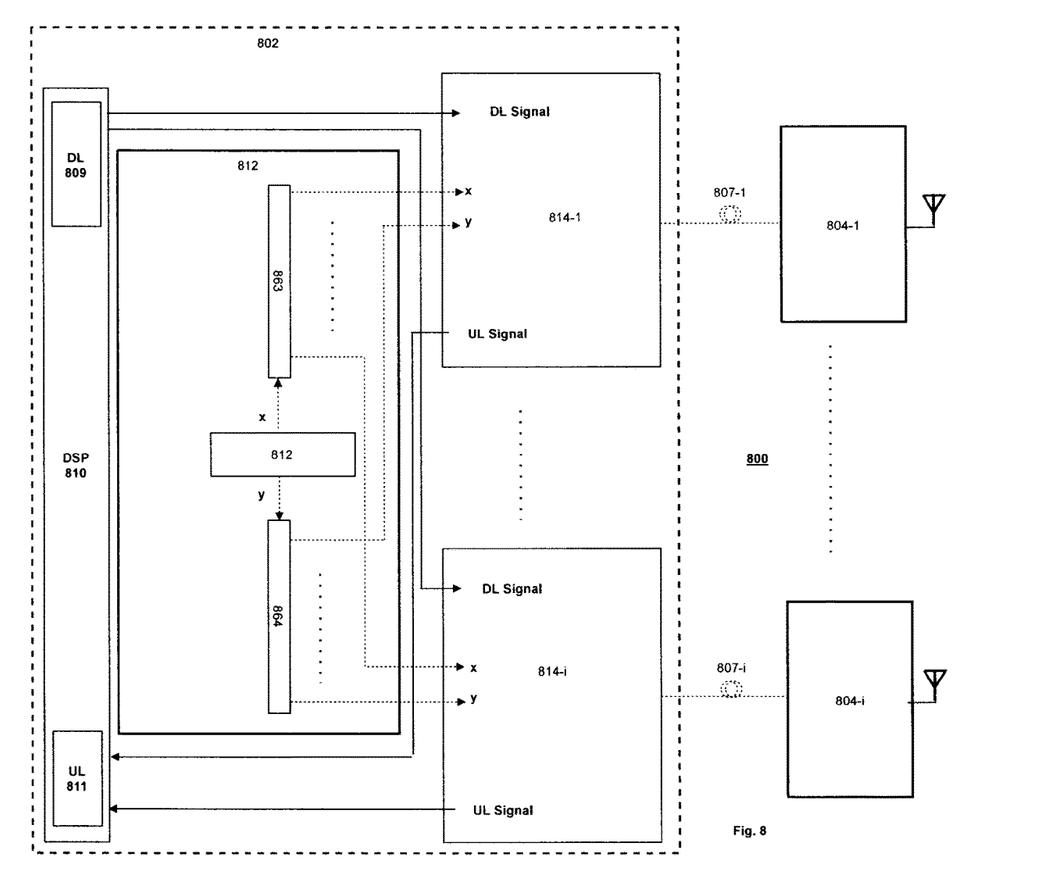
FIG. 8 shows a detailed block diagram of the multiple link architecture according to an embodiment of the present matter.

Referring to FIG. 8 there is shown a block diagram 800 of an optical splitting or polarization multiplexing arrangement for the N-link C-RAN network architecture 700 according to an embodiment of the present matter. As previously described in FIG. 7, the dual optical carrier generation and polarization block 812 generates the x-polarised and y-polarised optical signals from a laser (also as previously described herein). The polarization block 812 may use single PBS outputting signals to respective two optical splitters 863, 864. In order to provide carriers for the N RRHs the optical splitters or polarisation maintaining (PM) splitters split the x-polarised and y-polarised signals into multiple N signals to match a desired network size or number of RRHs. This implementation is less costly than using multiple PBSs with one optical splitter. The information signal IF frequencies ($f_1, f_2, \ldots f_N$) for each link may be decided and selected at network design time. Links have the same communication technique protocols but may have different DL and UL data and frequencies.

Figure 9:
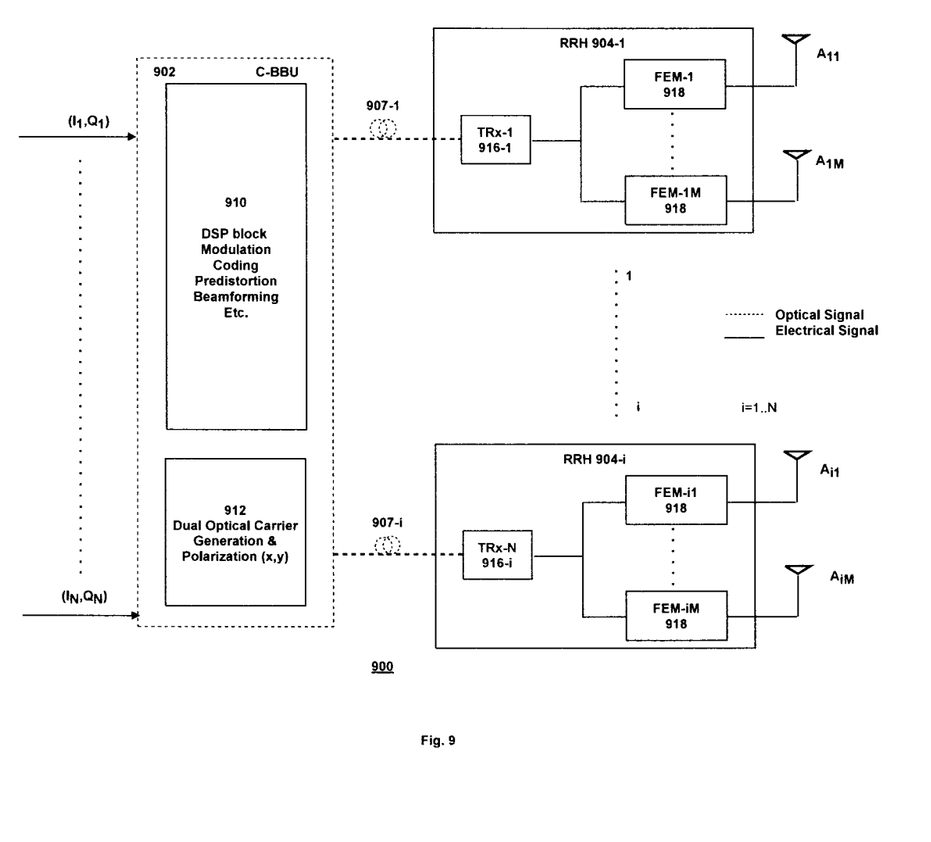
FIG. 9 shows a multiple-user-multiple-input-multiple-output (MU-MIMO) architecture with beamforming using the RoF Transceivers according to an embodiment of the present matter.

Referring to FIG. 9 there is shown a MU-MIMO architecture 900 with beamforming using the C-BBU 102 and RRH 104 transceivers according to an embodiment of the present matter. The MIMO architecture 900 with beamforming includes a BBU unit receiving different input signals ($I_1$, $Q_1$) to (Ii, Qi), where i=1 ... N that are converted to optical signal before transmitting them to the RRHs over N optical fibers as described previously herein. At each respective RRH unit 904-1 ... 904-$i$, each respective optical stream is converted to an electrical signal, as previously described herein. However for each RRH the stream is divided into M signals each driving respective ones of M FEMs (e.g. (FEM-11 ... FEM-1M) ... (FEM-i1 ... FEM-iM)) where each FEM in turn is connected to a phased array antenna having M elements. Each FEM includes a PA, an LNA, single-pole double-throw (SPDT) switch along with amplitude and phase controllers which can be configured for applying amplitude and phase control on the signals for beamforming. The frequencies of the signals at the outputs of RRH units are controlled by BBU. In one embodiment of the configuration 900 all the frequencies may be set to the same value, the system may then be operated in a mode of a full MIMO transceiver with multi-beam capability. In a further embodiment of the configuration 900 all the frequencies may be set to different values, the system may then be operated in a mode of a multi-user MIMO transceiver with multi-beam capability.

Figure 10:
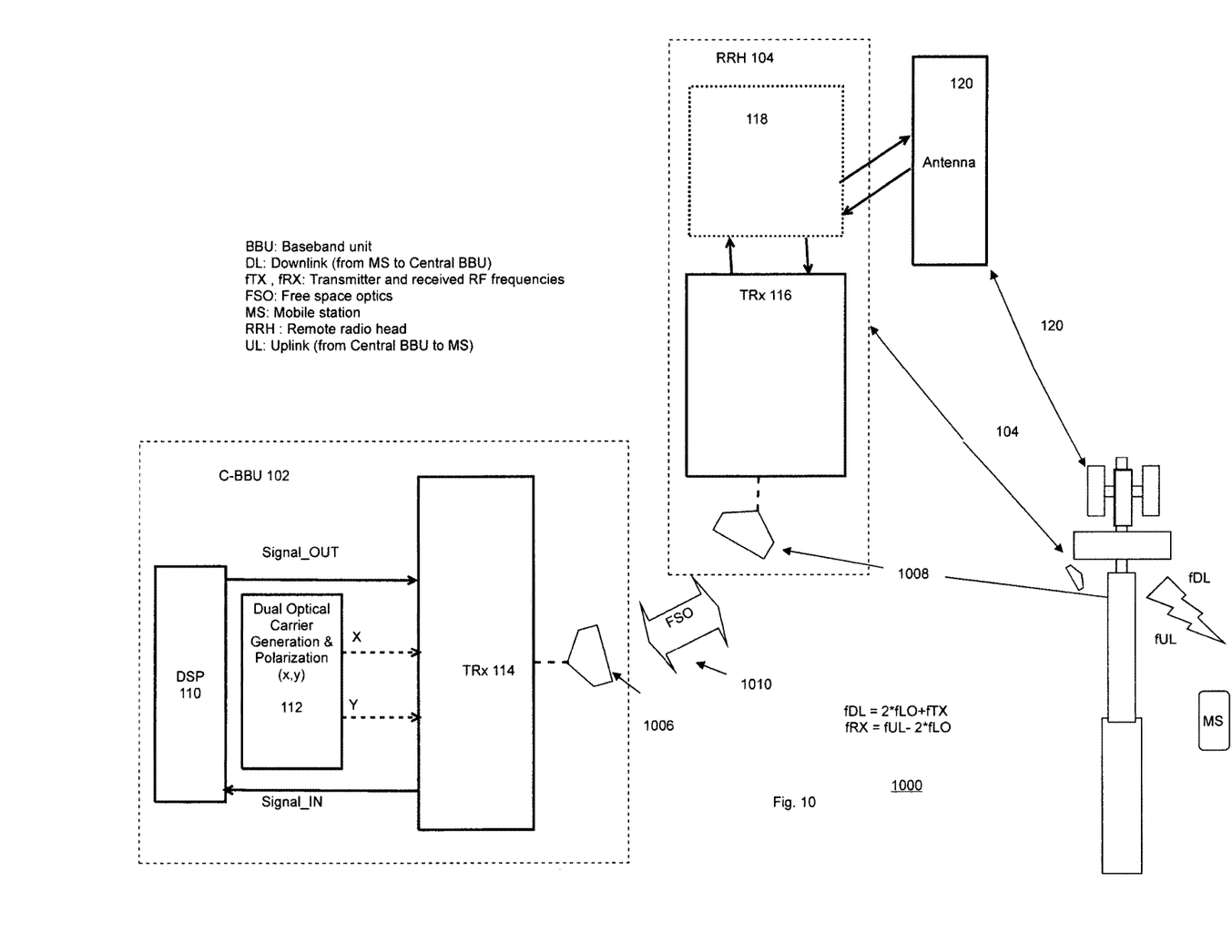
FIG. 10 shows a block diagram of a free space optical channel architecture for the C-RAN system using the RoF transceivers according to a further embodiment of the present matter.

Referring to FIG. 10 there is shown a C-RAN architecture 1000 using the C-BBU 102 and RRH 104 transceivers, described previously herein, configured with a free-space-optical (FSO) channel, according to an embodiment of the present matter. In the illustrated embodiment 1000 the BBU transceivers and the RRH transceivers are configured to use an FSO channel 1010 instead of the optical fiber. Although in some instance combinations of FSO and optical fiber channels may be used. The BBU transceiver includes a FSO transducer 1006 which communicates over free space with a corresponding FSO transducer 1008 at the BBU.

Figure 11:
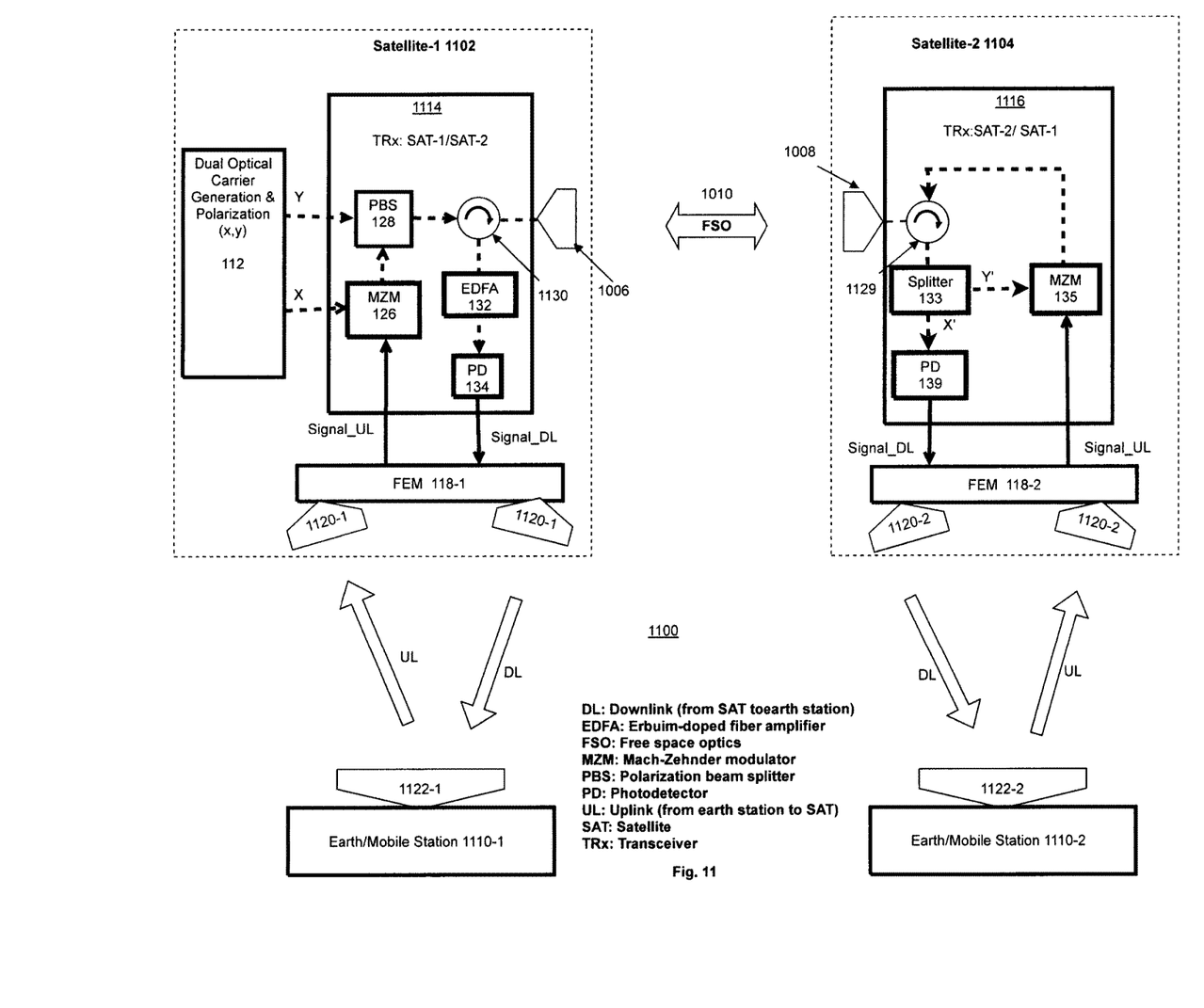
FIG. 11 shows a block diagram of a satellite communication architecture configured to use an RoF transceiver according to an embodiment of the present matter.

Referring to FIG. 11 there is shown a C-RAN architecture 1100 for satellite (SAT) applications which connects two or more satellites, with ground/mobile stations. For example, as shown in the illustrated embodiment two satellites are shown SAT-1 1102 and SAT-2 1104 and ground/mobile stations 1110-1 and 1110-2. The satellite SAT-1 1102 configured for operation similar to C-BBU 102 as described previously in FIG. 1. The satellite SAT-1 1102 is linked to the remote SAT-2 1104 which is configured to operate similar the RRH 104 unit of FIG. 1. The satellite SAT-1 1102 includes similar components as the C-BBU 102 except that the DSP unit may be located in the ground/mobile stations 1110-1, 1110-2. The transceivers 1114 and 1116 are configured to route bidirectional optical communications over an FSO channel 1010 (similar to the fronthaul link 107, in FIG. 1), between the satellites SAT-1 and SAT-2. A first optical transducer 1006 in SAT-1 and a second optical transducer 1008 in SAT-2 are configured to couple an optical signal from fiber to free space and vice versa. Also, the transceiver 1114 may route the bidirectional RF signals between SAT-1 1102 and the earth/mobile station 1110-1 through an FEM 118-1. For example, in one embodiment, microwave antennas 1120-1 in SAT-1 and 1122-1 at the earth/mobile station may couple the broadcast RF UL signals and DL signals from free space to an RF path.

The SAT-2 1104 includes the transceiver 1116 configured to operate similar to that described previously for the transceiver 116 of FIG. 1, to establish full-duplex optical link between SAT-1 and SAT-2. The transceiver 1116 routes bidirectional RF signals between SAT-2 1104 and the earth/mobile station 1110-2 through a FEM 118-2 in the satellite SAT-2. Microwave antennas 1120-2 in SAT-2 and 1122-2 in the earth/mobile station 1110-2 couple the RF UL signals and DL signals from free space to the RF network.

It may be seen from the above description that embodiments of the present matter provide for base transceiver stations to be physically smaller, less expensive, and easier to deploy. Furthermore, the present architecture reduces reliance on use of a local multipoint distribution system (LDMS) as a carrier which in turn may limit degrees of the freedom of frequency bands as well as overall cost of hardware.

The invention claimed is:

1. A radio communication system comprising:
   a baseband unit (BBH) having:
     an optical carrier generator for generating at least a pair of frequency spaced optical carrier signals;
     a transceiver configured to:
       modulate a first portion of the pair of spaced optical carrier signals with downlink (DL) information to generate a modulated first optical signal;
       combine an unmodulated second optical signal formed of a remaining unmodulated second portion of the pair of spaced optical carrier signals with the modulated first optical signal to form a combined optical signal for transmission over an optical link;
       receive an optical uplink (UL) signal from said optical link, said optical UL signal comprising UL information modulated on said unmodulated second portion of the spaced optical carrier signals; and
       down convert said received optical UL signal using a photodetector to output an electrical signal at a baseband frequency;
   a remote radio head (RRH) unit for receiving said combined optical signal, said RRH configured to recover said modulated first optical signal and said unmodulated second optical signal into respectively, a third polarised signal and fourth polarised signal, wherein said third polarised signal is down converted using a photodetector to output a DL electrical signal at an RF frequency to be broadcasted by an antenna, and wherein said fourth polarised signal is modulated by an UL electrical signal at an RF frequency received by said antenna to generate a modulated fourth polarised optical signal; and
   an optical link coupling the BBU and the RRH, wherein the BBU and the RRH are configured to have respective optical link interfaces to simultaneously communicate over the optical link the modulated first optical signal, the unmodulated second optical signal, and the modulated fourth polarised optical signal forming the UL optical signal.

2. The radio communication system of claim 1, wherein the RRH includes a diplexer or a switch for sharing the antenna between signal reception and signal transmission, a power amplifier to amplify the DL electrical signal to be transmitted by the antenna and a low noise amplifier to amplify the received UL electrical signal by the antenna.

3. The radio communication system of claim 1, including a plurality of RRH's and further including polarisation maintaining beam splitters to generate an equally split number of orthogonal optical carriers for each RRH.

4. The radio communication system of claim 1, including a digital predistortion linearization block configured to linearize DL signals by constructing a digital base band predistortion model to predistort DL signals at the BBU to compensate for nonlinear distortion and hardware impairments in a signal path of the DL signals through the BBU and RRH.

5. The radio communication system of claim 4, the digital predistortion linearization block including a feed back observation path in the RRH.

6. The radio communication system of claim 5, where the feed back observation path is implemented with a single MZM.

7. The radio communication system of claim 5, where the feed back observation path is implemented with two MZM's.

8. The radio communication system of claim 1, wherein the RRH is configured for MIMO communication.

9. The radio communication system of claim 8, the MIMO RRH configured with phased array multibeam antennae for multi-user MIMO applications.

10. The radio communication system of claim 9, including a plurality of RRH's configured to operate at a same frequency.

11. The radio communication system of claim 9, including a plurality of RRH's configured to operate at different frequencies.

12. The radio communication system of claim 1, wherein the transceiver and RRH are configured for communications between earth stations and satellites.

13. The radio communication system of claim 1, wherein the transceiver and RRH are configured for communications between satellites.

14. A radio communication system comprising:
   a remote radio head (RRH) unit having a RRH transceiver configured to:
     receive a combined optical signal over an optical link, said combined optical signal comprising a modulated first optical and an unmodulated second optical signal, the modulated first optical signal generated by modulating DL information on a first portion of a pair of spaced optical carrier signals;
     recover said modulated first optical signal and said unmodulated second optical signal into respectively, a third polarised signal and fourth polarised signal, wherein said third polarised signal is broadcast by an antenna, and
   wherein said fourth polarised signal is modulated by the UL information received by said antenna to generate a modulated fourth polarised optical signal; and
   an optical link coupling RRH to a central station, wherein the optical link simultaneously communicates the modulated first optical, the unmodulated second optical signal, and the modulated fourth polarised optical signal forming an UL optical signal.

* * * * *